2 Sheets--Sheet 1.

W. L. THOMPSON.
Cultivator.

No. 131,720.

Patented Sep. 24, 1872.

Witnesses
A. T. Langston
Sydney E. Smith

Inventor:
William L. Thompson,
by E. R. Brown,
Attorney.

W. L. THOMPSON.
Cultivator.
No. 131,720.
2 Sheets--Sheet 2.
Patented Sep. 24, 1872.
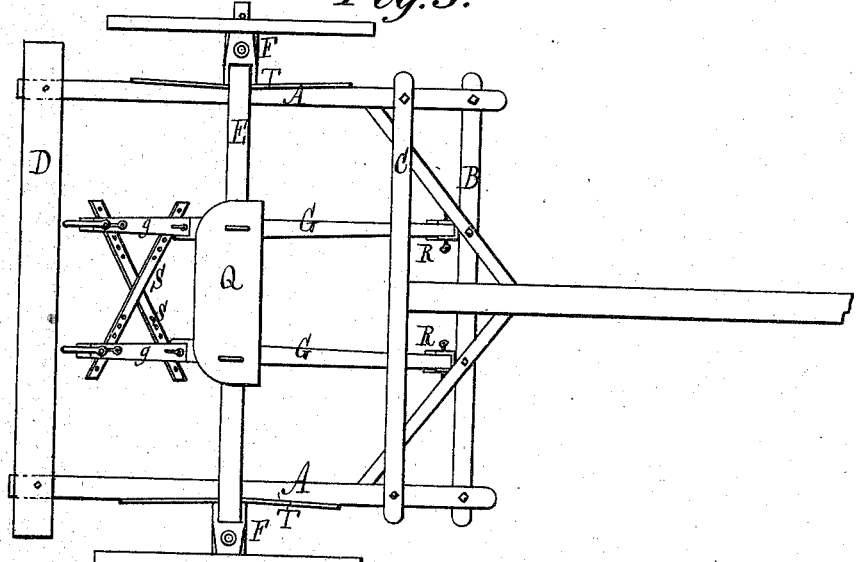
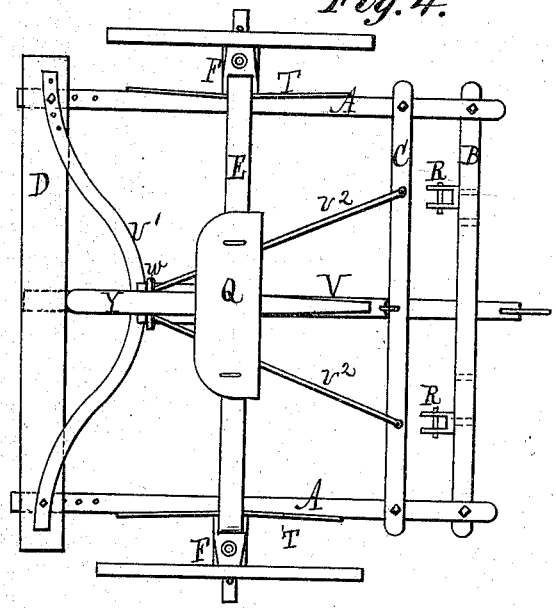
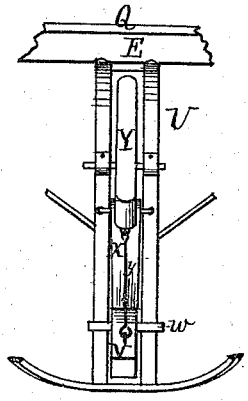
Witnesses.
A. T. Langston
Sydney E. Smith
Inventor:
William L. Thompson,
by E. R. Brown,
Attorney.

UNITED STATES PATENT OFFICE.

WILLIAM L. THOMPSON, OF ROCKVILLE, INDIANA.

IMPROVEMENT IN CULTIVATORS.

Specification forming part of Letters Patent No. 131,720, dated September 24, 1872.

*To all whom it may concern:*

Be it known that I, WILLIAM L. THOMPSON, of Rockville, in the county of Parke and State of Indiana, have invented a new and useful Improvement in Cultivators; and I do hereby declare that the following is a full, clear, and exact description thereof, sufficient to enable those skilled in the art to which my invention appertains to make and use the same, reference being had to the accompanying drawing making part of this specification, and to the letters and figures marked thereon.

My invention relates to a combined marker, cultivator, and breaking-plow; and it consists in the peculiar construction and arrangement of parts, as hereinafter particularly described.

Figure 1:
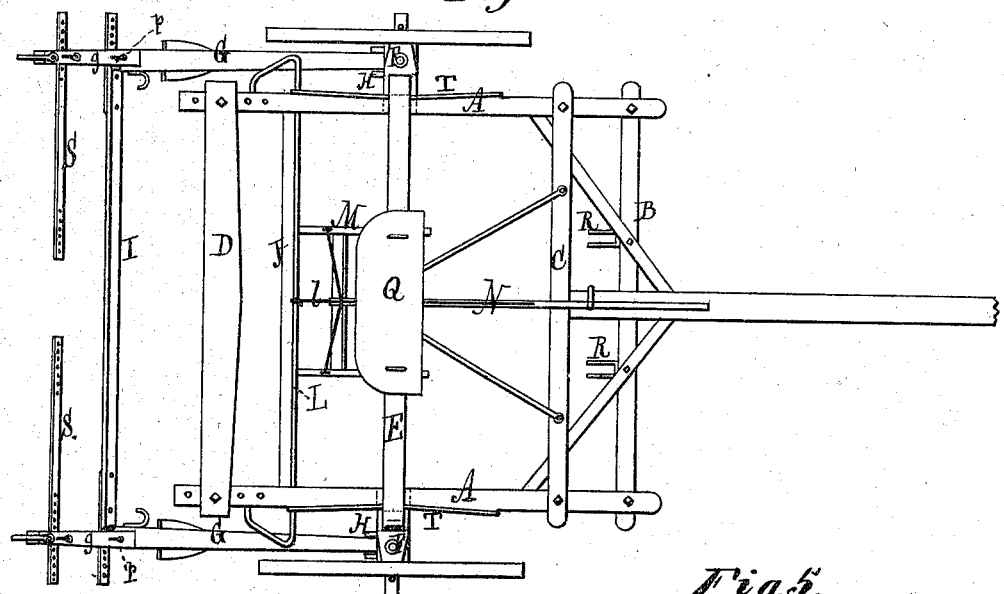
Figure 5:
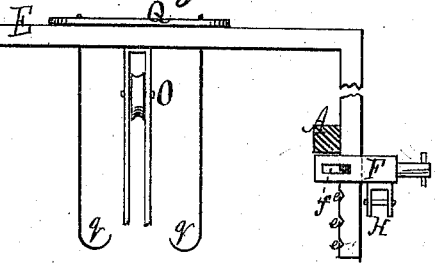
Figure 2:
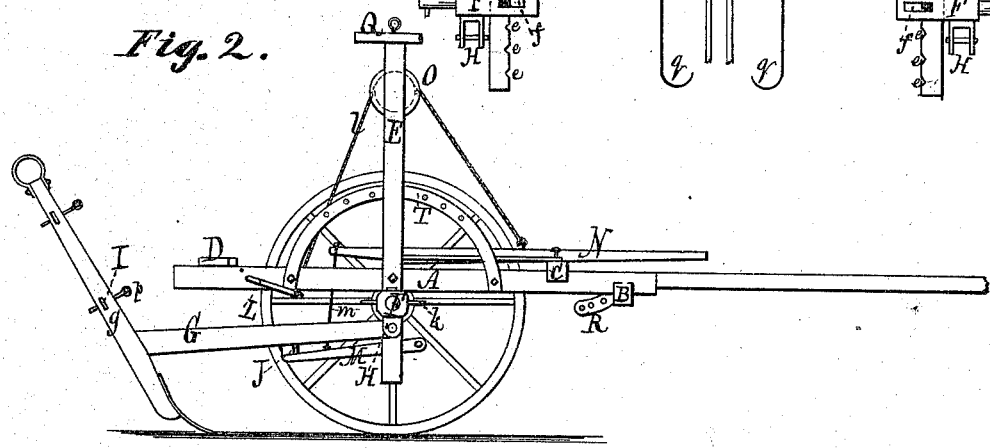

In the accompanying drawing, Figure 1, Sheet 1, represents a plan or top view of my invention when used for marking or laying off ground; Fig. 2 is a side elevation of the same; Fig. 3, Sheet 2, is a plan or top view of the machine arranged as a cultivator; Fig. 4 shows the machine arranged as a breaking-plow; and Figs. 5 and 6 are detached views, hereinafter particularly referred to.

A A represent the side rails, and B the front bar, of the supporting-frame. C is a bar placed just in the rear of the bar B, and preferably on the upper side of the frame. D is a board which connects the rear ends of the rails A A, and also serves as a seat for the driver. E is the axle, made of bar-iron, the ends bent downward, as shown in Fig. 5, and passing through openings in the spindles F, being secured in place by means of keys $k$ inserted in slots $f$ in the spindles and engaging with notches $e$ in the axle.

When the machine is to be used for laying off ground the plow-beams G G (see Figs. 1 and 2) are attached to clevises H H on the spindles F, the plow-helves $g\ g$ being connected by the coupling I in the rear of the frame and the limber-coupling J underneath. The distance apart of the helves is regulated by pins $p$ passing through holes in the ends of the coupling. The plows are held in the ground by means of a pivoted iron rod, L, attached to the side rails A A, which may be adjusted to regulate depth of plowing by different sets of holes in the rails. The plows are raised from the ground by means of a gate, M, pivoted under the frame and connected by a cord or rod, $m$, to a lever, N, which lever is also connected with the rod L by means of a cord, $l$, passing over a pulley, O, attached to the axle immediately under the seat Q, so that the driver, sitting on seat Q, by pressing his foot on lever N releases the rod L from contact with the plow-beams and raises the plows from the ground.

When the machine is to be used as a cultivator the plow-beams are detached from the clevises H, the couplings I J, lever N, and gate M are removed, and the plow-beams are attached to clevises R on the front bar B of the frame, the helves $g\ g$ being connected together by two iron bars, S S, as shown in Fig. 3, the distance apart being regulated by different sets of holes through which the pins pass. The clevises R may be moved further apart or nearer together by means of different sets of holes in the bar B; and the clevises are made long enough to contain several sets of holes, so that the plows may be regulated to run deep or shallow. When the plows are not in use they may be hung on hooks $q\ q$ under the seat Q. The driver sits on seat D, and the frame may be adjusted backward or forward to suit his weight by means of the curved braces T, shown clearly in Fig. 2. The axle may be raised or lowered by removing the keys $k$ in the spindles F.

When the machine is to be used as a breaking-plow the plow-beams G G are removed, and the breaking-plow beam V substituted by attaching the ends of curved braces $v^1$ to the rear corners of the bars A A and seat D by means of bolts, and attaching the ends of braces $v^2\ v^2$ in a similar manner to the bar C. The plow-beam V passes through a curved clevis, U, the lower portion of which is attached to the curved brace $v^1$ and the upper portion curves forward and is bolted to the axle E under the seat Q. Passing through the rear end of the beam V is a pin, $w$, which bears against the lower portion of the curved clevis for the purpose of drawing the plow. Near the front portion the beam V is suspended from a hook on the bar C. The horses are attached to the front end by means of an ordinary double-tree. The plow is held down by a holder, X, pivoted in the curved clevis U, which may be adjusted high or low, as desired. The plow is raised by means of a lever, Y, pivoted in the curved clevis and connected with the beam by a rod, $y$. One or both of the wheels may be changed to run inside the axle by reversing the spindles. The depth of plowing is regulated by hitching the team long or short. The driver sits on seat Q. One wheel may run in the furrow and the other on the land, and the axle adjusted by means of the keys.

Having thus described my invention, what I claim as new, and desire to secure by Letters Patent, is—

The combination of the bars A A, the bar B provided with the clevises R R, the bar C, seat D, axle-tree E, keyed spindles F F provided with clevises H H, and the curved braces T T, when so constructed and arranged as to be adapted to receive the parts used for marking, cultivating, and breaking, in the manner herein shown and described.

The above specification of my invention signed by me this 15th day of April, 1872.

WM. L. THOMPSON.

Witnesses:
JOHN D. HUNT,
JOHN B. DOWD.